R. J. CROWLEY.
BATTERY.
APPLICATION FILED MAY 1, 1917.
1,306,214.
Patented June 10, 1919.
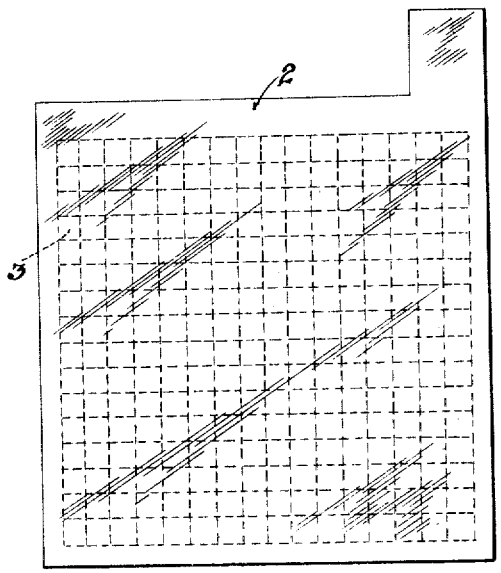
Inventor
Richard Joseph Crowley
by Mason Fenwick Lawrence,
Attorneys

UNITED STATES PATENT OFFICE.

RICHARD JOSEPH CROWLEY, OF DALLAS, TEXAS, ASSIGNOR OF ONE-FIFTH TO ALBERT KRAMER, ONE-FIFTH TO THOMAS RICHARD TENNANT, ONE-FIFTH TO HERBERT BYRON TENNANT, AND ONE-FIFTH TO MAX ROTHMAN, ALL OF DALLAS, TEXAS.

BATTERY.

1,306,214.      Specification of Letters Patent.      Patented June 10, 1919.

Application filed May 1, 1917. Serial No. 165,785.

*To all whom it may concern:*

Be it known that I, RICHARD JOSEPH CROWLEY, a subject of the King of Great Britain, residing at Dallas, in the county of Dallas and State of Texas, have invented certain new and useful Improvements in Batteries; and I do hereby declare the following to be a full, clear, and exact description of the invention, such as will enable others skilled in the art to which it appertains to make and use the same.

This invention relates to electrochemistry, and more particularly to batteries. The invention pertains especially to the plates of batteries and a method for making the same.

An object of the invention is to provide a method for the manufacture of plates or grids having an active filling or agent consisting of lead-oxid and aluminum sulfate, and to provide a method of producing a battery plate or grid paste of this compound. A further object of the invention is to provide a battery plate or grid having a lead-oxid and aluminum sulfate medium; and to provide a paste or medium for either positive or negative plates. It is another object to provide a battery element which permits charging and discharging at a rapid rate without injury to the plates; will maintain a higher voltage at a heavy discharge, will have larger capacity than other lead cells, and to provide a plate of such character that the positive element will not disintegrate as rapidly as peroxid of lead positives.

With the above and other objects in view, the invention consists of the method of producing a battery composition and plate, and consists also of the product of the method as set forth hereinafter, a plate being shown in the accompanying drawing.

In the practice of the present method a paste of aluminum sulfate is made by dissolving this material in a suitable solvent, such as a solution of sulfuric acid and water, having a specific gravity of about 1.400 to which has been added a few drops of hydrochloric acid. With a suitable quantity of aluminum present, a white paste is formed.

This paste is then mixed with a fresh solution of sulfuric acid and water, of about 1.400 specific gravity in the proportion of about one pound of paste to one gallon of the solution, the whole being stirred. To this batch litharge or lead oxid is added, the mixture being continually stirred and combined in quantities to produce a thick paste consisting of lead-oxid and aluminum sulfate. This active material is then immediately applied to the plate or grid either by hand or otherwise. During the mixture considerable heat is developed.

The active material may be used for both positive and negative plates; on lead grids, or on aluminum or aluminum alloy grids, as negative elements. The impregnated plates are then dried.

Owing to the firmness, strength and properties of the composition the plates may be of very thin construction, thus producing a comparatively light organized battery of large capacity and one in which the voltage remains more constant at a heavy rate of discharge.

The dry plates are then in condition for "forming" by connection either to the positive or negative poles of an electric generator.

A suitable electrolyte may be used in an organized battery, as for instance sulfuric acid and water, but with plates of this nature, an efficient battery is formed with an acid sulfate of aluminum. This is adaptable for transportation as a solid and needs only the addition of water, preferably distilled, to form an electrolyte.

This invention enables the construction of comparatively light batteries especially serviceable for various types of vehicles, and for electric lighting and engine starting purposes.

In the drawing a grid 2 is represented, the cells of which are impregnated by the novel active material 3 above set forth.

Both grids and paste may be exactly the same composition; the grids of lead or aluminum, and the paste filling of a mixture of sulfate of aluminum and litharge.

Either one of the above plates can be made a "positive" or a "negative" element by simply connecting it to the positive or negative wire of the "forming" bath; the plate connected to the positive wire becoming the anode, and that connected to the negative wire, the cathode when the current is turned on. The electrolyte may consist of sulfuric acid and water of specific gravity about 1.200. This specific gravity increases as the forming process goes on and when it reaches about 1.300 the plates should be discharged till they register only about 1.7 volts and the forming process again repeated—every repeated charge and discharge will advance the plates in the forming process until finally formed and ready for commercial use. Many hundreds can be formed at the same time.

When the plates are "formed" and ready for service the negatives will be a bluish slate color, while the positives will show a dark brown or, if allowed to stand for some weeks before "forming", a white sulfate will form on their surface which will present an even surface, not altered in appearance by the current, and without lowering the capacity or voltage of the plate will considerably strengthen it against wear and tear. A positive prepared this way will appear a grayish white in color.

I have discovered that two pieces of aluminum, one being used as an "anode" and the other as a cathode, in an electrolyte consisting of a thin preparation of the paste described in my specification will each receive a coating when a current is passing between the plates, the anode becoming a rich brown color, and the cathode a grayish color, while a potential of over 2 volts will be established between them.

From this discovery to the adoption of aluminum grids, using the paste described in my specification, as a filling, is but a step, thereby greatly reducing the weight of storage batteries, as 10 lbs. of aluminum will make 5 times the number of plates, 10 lbs. of lead will make, and of equal size and greater efficiency.

The aluminum gives also a higher potential and greater strength to endure vibration and shocks, while aluminum as a positive element shows no evidence of wear and tear after the passage of the most powerful currents, while under the same circumstances lead would become disrupted and would crumble under little pressure.

I dissolve aluminum in a strong solution of sulfuric acid and water sp. grav. about 1.300 or 1.400, and add to this while still liquid a suitable quantity of litharge. Both substances combine, evolving heat and fumes; while color changes also take place indicating a chemical union of the constituents. This chemical action is greater the larger the quantity of nascent aluminum sulfate present. With the maximum quantity of aluminum in solution the heat generated is sufficient to boil water. By allowing the mixture to stand without stirring, for a minute or so it will become a brownish-black where not exposed to the atmosphere, indicating the formation of sulfid of lead, but this color disappears when the compound is stirred. All that remains now is to get the compound into as finely a divided state as possible by pounding and stirring when it is ready to immediately paste in the grinds. This compound is different in its chemical reactions from either litharge or sulfate of aluminum; and is oxidized by air, changing to a light gray color, and the plates should be put in the forming bath within 24 hours after pasting.

Heretofore all attempts to combine lead with a lighter metal to form a paste, or active material, have proved failures owing to the local action which was caused by the difference in potential of the different elements employed. This local action means that electrochemical discharges and reactions are continually going on in the battery internally, even when it is idle, thus wasting its charge and causing it to deteriorate rapidly.

The new aluminum lead battery has as little local action as the best lead batteries made and it promises to eliminate local action altogether as with aluminum negative no antimony will be required, the antimony being employed only to harden the grids, thus helping to prevent buckling. Aluminum grids will not buckle, and aluminum negatives will relieve the strain on the positive plates, both electrically and mechanically each positive being supported on each side by a non-buckling aluminum plate.

Now in tests and experiments so far with the standardized volt and ammeter, I have found that my aluminum lead battery gives a higher potential than any lead battery manufactured, and it recuperates after a discharge more rapidly than any lead battery.

This would also show that there is less local action than the lead battery, and that the aluminum-lead paste is a true chemical compound, whose potential like lead, can be made positive or negative by the charging current.

What is claimed as new is:

1. The active material for battery plates, which consists of aluminum sulfate and litharge.

2. A paste or compound for battery plates consisting of an oxid of lead and a sulfate of aluminum and an acid vehicle.

3. An active material consisting of a salt of aluminum, an oxid of lead, and sulfuric acid.

4. In an electric battery, a plate or grid impregnated with an active material consisting of aluminum sulfate and litharge.

5. The combination with a plate, electrodes or element of a storage battery, of an active material consisting of a salt of aluminum, an oxid of lead, and sulfuric acid.

6. As the active material on the positive and negative plates, electrodes, or elements of storage batteries, the combination of a salt of aluminum, an oxid of lead and sulfuric acid which has undergone certain chemical changes through the action of an electric current in an electrolyte substantially as described.

7. A paste for battery plates consisting of oxid of lead, sulfate of aluminum and sulfuric acid.

8. As an active material for battery plates, a paste consisting of an oxid, a sulfate and an acid.

9. An active material for battery plates consisting of oxid of lead, sulfuric acid and the salt of another metal.

In testimony whereof I affix my signature.

RICHARD JOSEPH CROWLEY.